United States Patent
Wasilewski

(10) Patent No.: US 8,205,243 B2
(45) Date of Patent: Jun. 19, 2012

(54) CONTROL OF ENHANCED APPLICATION FEATURES VIA A CONDITIONAL ACCESS SYSTEM

(76) Inventor: Anthony J. Wasilewski, Alpharetta, GA (US)

( * ) Notice: Subject to any disclaimer, the term of this patent is extended or adjusted under 35 U.S.C. 154(b) by 1034 days.

(21) Appl. No.: 11/275,183

(22) Filed: Dec. 16, 2005

(65) Prior Publication Data

US 2007/0143854 A1    Jun. 21, 2007

(51) Int. Cl.
*G06F 21/00* (2006.01)

(52) U.S. Cl. .............. 726/2; 726/26; 713/151; 713/168; 380/210; 725/25; 725/31

(58) Field of Classification Search .................. 713/168, 713/151; 726/2
See application file for complete search history.

(56) References Cited

U.S. PATENT DOCUMENTS

| | | | |
|---|---|---|---|
| 5,870,474 A * | 2/1999 | Wasilewski et al. | 380/211 |
| 5,933,498 A | 8/1999 | Schneck et al. | |
| 6,157,719 A | 12/2000 | Wasilewski et al. | |
| 6,424,714 B1 * | 7/2002 | Wasilewski et al. | 380/200 |
| 6,526,508 B2 * | 2/2003 | Akins et al. | 713/168 |
| 6,754,908 B1 * | 6/2004 | Medvinsky | 725/107 |
| 6,874,075 B2 * | 3/2005 | Jerding et al. | 711/170 |
| 7,337,464 B2 * | 2/2008 | Bogot | 725/151 |
| 7,355,621 B1 * | 4/2008 | Fernandez et al. | 348/14.08 |
| 7,386,128 B2 * | 6/2008 | Moroney | 380/210 |
| 7,743,407 B2 * | 6/2010 | Sprigg et al. | 726/4 |
| 2002/0067376 A1 * | 6/2002 | Martin et al. | 345/810 |
| 2002/0092015 A1 * | 7/2002 | Sprunk et al. | 725/9 |
| 2003/0074565 A1 * | 4/2003 | Wasilewski et al. | 713/182 |
| 2003/0182429 A1 * | 9/2003 | Jagels | 709/227 |
| 2003/0200313 A1 | 10/2003 | Peterka et al. | |
| 2004/0045028 A1 * | 3/2004 | Harris | 725/86 |
| 2004/0083177 A1 * | 4/2004 | Chen et al. | 705/50 |
| 2004/0181800 A1 * | 9/2004 | Rakib et al. | 725/25 |
| 2004/0181811 A1 * | 9/2004 | Rakib | 725/122 |
| 2004/0226051 A1 * | 11/2004 | Carney et al. | 725/135 |
| 2005/0155063 A1 * | 7/2005 | Bayrakeri et al. | 725/47 |
| 2005/0166246 A1 * | 7/2005 | Calmels et al. | 725/105 |
| 2005/0187880 A1 * | 8/2005 | Ezaki | 705/59 |
| 2006/0015889 A1 * | 1/2006 | Cho | 725/6 |
| 2006/0137015 A1 * | 6/2006 | Fahrny et al. | 726/26 |
| 2006/0294512 A1 * | 12/2006 | Seiden | 717/168 |

OTHER PUBLICATIONS

Jiang et al., Secure communication between set-top box and smart card in DTV broadcasting, Consumer Electronics, IEEE Transactions, Aug. 2004, vol. 50, Issue 3, p. 882-886.*
Schneck, "Persistent access control to prevent piracy of digital information", Proceedings of the IEEE, Jul. 1999, vol. 87 Issue:7, On pp. 1239-1250.*

* cited by examiner

*Primary Examiner* — Taghi Arani
*Assistant Examiner* — Morshed Mehedi
(74) *Attorney, Agent, or Firm* — Merchant & Gould

(57) ABSTRACT

A service provider provides conditional access to data that is decrypted by authorized set-top boxes (DHCTs). The encrypted programs include encrypted enhanced programs by adding a field to entitlement management messages and corresponding entitlement control messages.

21 Claims, 6 Drawing Sheets

CONTROL OF ENHANCED APPLICATION FEATURES VIA A CONDITIONAL ACCESS SYSTEM

CROSS-REFERENCE TO RELATED PATENT APPLICATIONS

The present application is related to U.S. Pat. No. 6,424,714, Wasilewski, et al., which was filed on Aug. 18, 1998 entitled "Conditional Access System," the disclosure and teachings of which are incorporated by reference in its entirety.

FIELD OF THE INVENTION

The invention concerns systems for protecting information and more particularly concerns systems for protecting information that is transmitted by means of a wired or wireless medium against unauthorized access.

BACKGROUND OF THE INVENTION

One way of distributing information is to broadcast it, that is, to place the information on a medium from which it can be received by any device that is connected to the medium. Television and radio are well-known broadcast media. If one wishes to make money by distributing information on a broadcast medium, there are a couple of alternatives. A first is to find sponsors to pay for broadcasting the information. A second is to permit access to the broadcast information only to those who have paid for it. This is generally done by broadcasting the information in scrambled or encrypted form. Although any device that is connected to the medium can receive the scrambled or encrypted information, only the devices of those users who have paid to have access to the information are able to unscramble or decrypt the information.

A service distribution organization, for example a communications system or a satellite television company, provides its subscribers with information from a number of program sources. For example, the History Channel is a program source that provides television programs about history. Each program provided by the History Channel is an "instance" of that program source. When the service distribution organization broadcasts an instance of the program source, it encrypts or scrambles the instance to form an encrypted instance. An encrypted instance contains instance data, which is the encrypted information making up the program.

An encrypted instance is broadcast over a transmission medium. The transmission medium may be wireless or it may be "wired", that is, provided via a wire, a coaxial cable, or a fiber optic cable. It is received in a large number of set-top boxes. The function of the set-top box is to determine whether an encrypted instance should be decrypted and, if so, to decrypt it to produce a decrypted instance comprising the information making up the program. This information is the delivered to a television set.

Subscribers generally purchase services by the month (though a service may be a one-time event), and after a subscriber has purchased a service, the service distribution organization sends the set-top box belonging to the subscriber messages required to provide the authorization information for the purchased services. Authorization information may be sent with the instance data or may be sent via a separate channel, for example, via an out-of-band RF link, to a set-top box. Various techniques have been employed to encrypt the authorization information. Authorization information may include a key for a service of the service distribution organization and an indication of what programs in the service the subscriber is entitled to watch. If the authorization information indicates that the subscriber is entitled to watch the program of an encrypted instance, the set-top box decrypts the encrypted instance. It will be appreciated that "encryption" and "scrambling" are similar processes and that "decryption" and "descrambling" are similar processes; a difference is that scrambling and descrambling are generally analog in nature, while encryption and description processes are usually digital.

The access restrictions are required in both analog and digital systems. In all systems, the continued technological improvements being used to overcome the access restrictions require more secure and flexible access restrictions. As more systems switch from an analog format to a digital format, or a hybrid system containing both analog and digital formats, flexible access restrictions will be required.

Restricting access to broadcast information is just as important for digital information, such as inserted advertising or enhanced applications and/or programs. For example, one approach is to insert advertising material as an overlay of a movie channel or a subscription channel. Without appropriate safeguards, some services may do this without the permission of the network operator or the owner of the instance. This use of both network bandwidth and instance content is undesirable from the viewpoint of the operators and the content owners. Thus, what is needed is a way to provide secure control of such "enhanced services."

DETAILED DESCRIPTION OF A PREFERRED EMBODIMENT

The present invention is directed towards a method and apparatus for delivering enhanced services by cryptographically protecting the attributes of the services. The following Detailed Description will first provide a general introduction to a conditional access system and to encryption and decryption. Next, the Detailed Description will describe how the conditional access system can be used to dynamically add and remove access to enhanced services, such as applications, inserted advertising, or other enhanced services above the standard services offered the consumer, and the role of encryption and authentication in these operations.

Conditional Access System Overview

Figure 1:
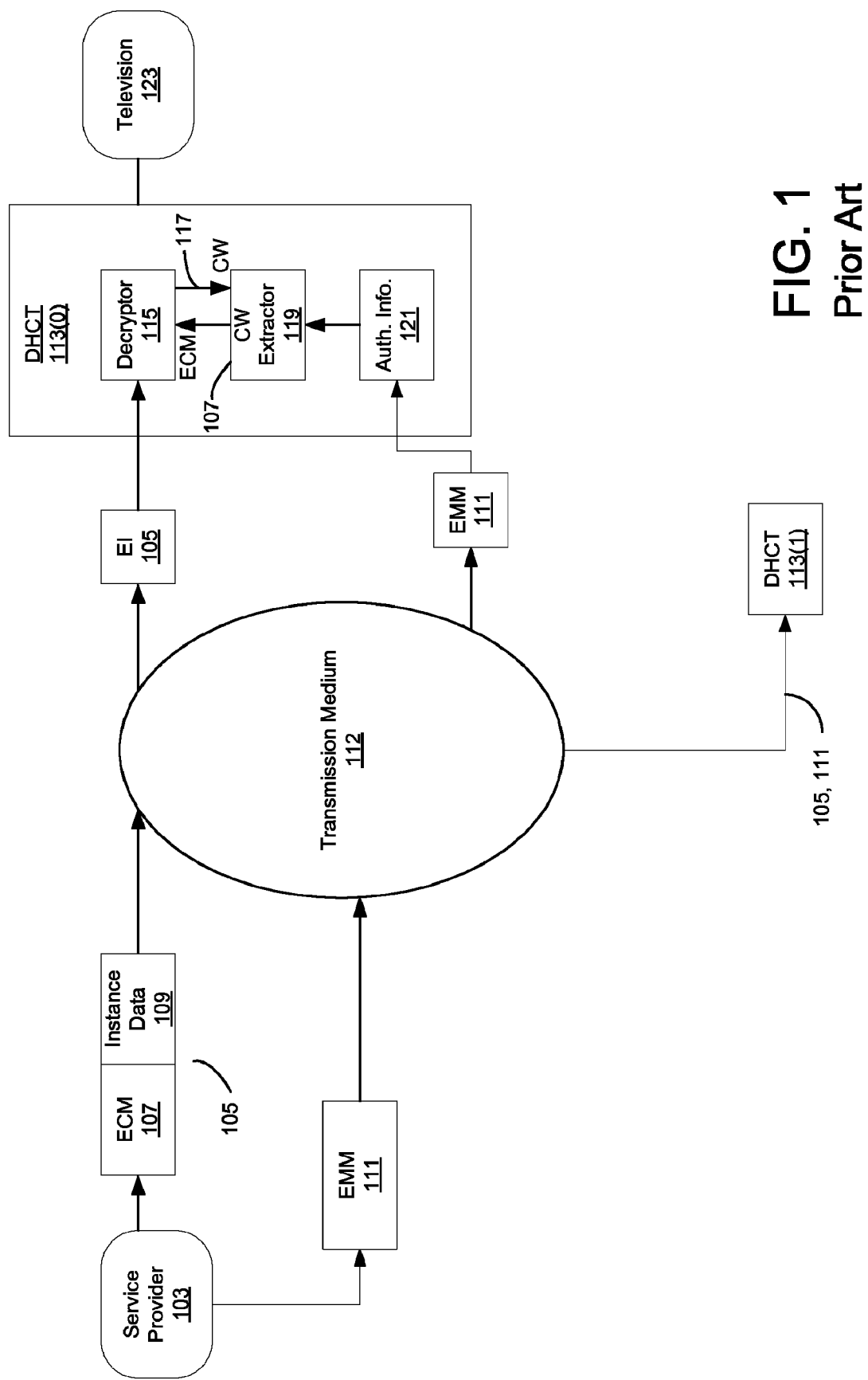
FIG. 1 is a block diagram of a conditional access system.

FIG. 1 provides an overview of a system 101 for limiting access to broadcast information. Such systems will be termed herein as a "conditional access system." A service provider 103, for example, a communications company or a satellite television company, provides its subscribers with information from a number of services that are a collection of certain kinds of information. For example, the History Channel is a service that provides television programs about history. Each program provided by the History Channel is an "instance" of that service. When the service distributor broadcasts an instance of the service, it encrypts the instance to form an encrypted instance 105. The encrypted instance 105 contains instance data 109, which is the encrypted information making up the program and entitlement control messages (ECM) 107. The entitlement control messages contain information needed to decrypt the encrypted portion of the associated instance data 109. A given entitlement control message is sent many times per second, so that it is immediately available to any new viewer or a service. In order to make decryption of instance data 109 even more difficult for pirates, the content of the entitlement control message is changed every few seconds, or more frequently.

Encrypted instance 105 is broadcast over a transmission medium 112. The medium may be wireless or it may be "wired," that is, provided via a wire, a coaxial cable, or a fiber optic cable. It is received in a large number of set-top boxes 113(0 . . . n), each of which is attached to a television set. It is a function of set-top box 113, referred to as a DHCT hereinafter, to determine whether the encrypted instance 105 should be decrypted and if so, to decrypt it to produce decrypted instance 123, which is typically delivered to the television set or to a digital recorder either internal or external to the DHCT 113. As shown in detail with regard to DHCT 113(0), DHCT 113 includes a decryptor 115, which uses a control word 117 as a key to decrypt the encrypted instance 105. The control word 117 is produced by a control word extractor 119 from information contained in the entitlement control message 107 and information from authorization information 121 stored in DHCT 113. For example, authorization information 121 may include a key for the service and an indication of what programs in the service the subscriber is entitled to watch. If the authorization information 121 indicates that the subscriber is entitled to watch the program of the encrypted instance 105, the control word extractor 119 uses the key together with information from ECM 107 to generate the control word 117. Of course, a new control word is generated for each new ECM 107.

The authorization information used in a particular DHCT 113(i) is obtained from one or more entitlement management messages 111 addressed to DHCT 113(i). Subscribers generally purchase services by the month (though a service may be a one-time event), and after a subscriber has purchased a service, the service distributor 103 sends the DHCT 113(i) belonging to the subscriber entitlement management messages (EMMs) 111 as required to provide the authorization information 121 required for the purchased services. EMMs may be sent interleaved with instance data 109 in the same fashion as ECMs 107, or they may be sent via a separate channel, for example via an out-of-band RF link, to DHCT 113(i), which stores the information from the entitlement management message (EMM) 111 in authorization information 121. Of course, various techniques have been employed to encrypt entitlement management messages 111.

The encryption and decryption techniques used for service instance encoding and decoding belong to two general classes: symmetrical key techniques and public key techniques. A symmetrical key encryption system is one in which each of the entities wishing to communicate has a copy of a key; the sending entity encrypts the message using its copy of the key and the receiving entity decrypts the message using its copy of the key. An example symmetrical key encryption-decryption system is the Digital Encryption Standard (DES) system. A public key encryption system is one in which each of the entities wishing to communicate has its own public key-private key pair. A message encrypted with the public key can only be decrypted with the private key and vice-versa. Thus, as long as a given entity keeps its private key secret, it can provide its public key to any other entity that wishes to communicate with it. The other entity simply encrypts the message it wishes to send to the given entity with the given entity's public key and the given entity uses its private key to decrypt the message. Where entities are exchanging messages using public key encryption, each entity must have the other's public key. The private key can also be used in digital signature operations, to provide authentication.

Figure 2A:
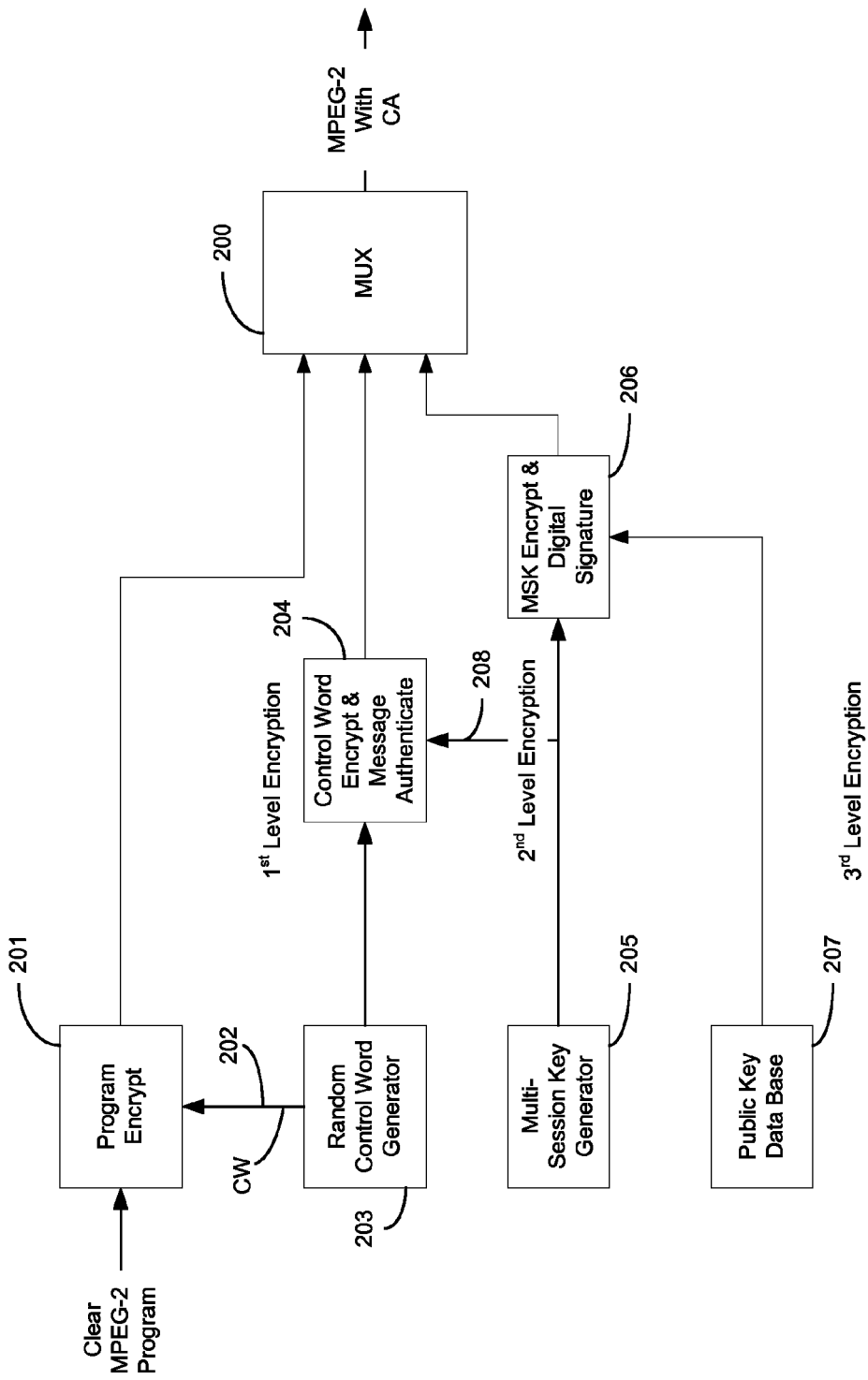
FIG. 2A is a block diagram of a service instance encryption.

As an overview, the encryption system uses symmetrical key encryption techniques to encrypt and decrypt the service instance and public key encryption techniques to transport a copy of one of the keys used in the symmetrical key techniques of the key from the service provider to the DHCT 113. In FIG. 2A, clear services such as the elementary digital bit streams that comprise MPEG programs are sent through a $1^{st}$ level encryption called the program encrypt function 201, which is preferably a symmetric cipher such as the well-known DES algorithm. Each elementary stream may be individually encrypted and the resulting encrypted streams are sent to multiplexer 200 to be combined with other elementary streams and private data, such as conditional access data. The key used in the program encrypt function 201 is called the control word (CW) 202. The CW 202 is generated by control word generator 203, which can be either a physically random number generator or can use a sequential counter with a suitable randomization algorithm to produce a stream of random CWs. A new CW is generated frequently, perhaps once every few seconds and is applied to each elementary stream on the same time scale. Each new CW is encrypted by Control Word Encrypt & Message Authenticate function 204 using a Multi-Session key (MSK) 208 provided by Multi-Session Key generator 205. The CW is then combined into an ECM 107 with other service-related information. The ECM 107 is authenticated by Control Word Encrypt & Message Authenticate function 204, which produces a message authentication code using a keyed-hash value derived from the message content combined with a secret that can be shared with the receiving DHCT 113. This secret is preferably part or all of the MSK 208. The message authentication code is appended to the rest of the ECM 107. The CW 202 is always encrypted before being sent along with the other parts of the ECM to MUX 200. This encryption is preferably a symmetric cipher such as the Triple-DES algorithm using two distinct 56-bit keys (which taken together comprise MSK 208).

Figure 2B:
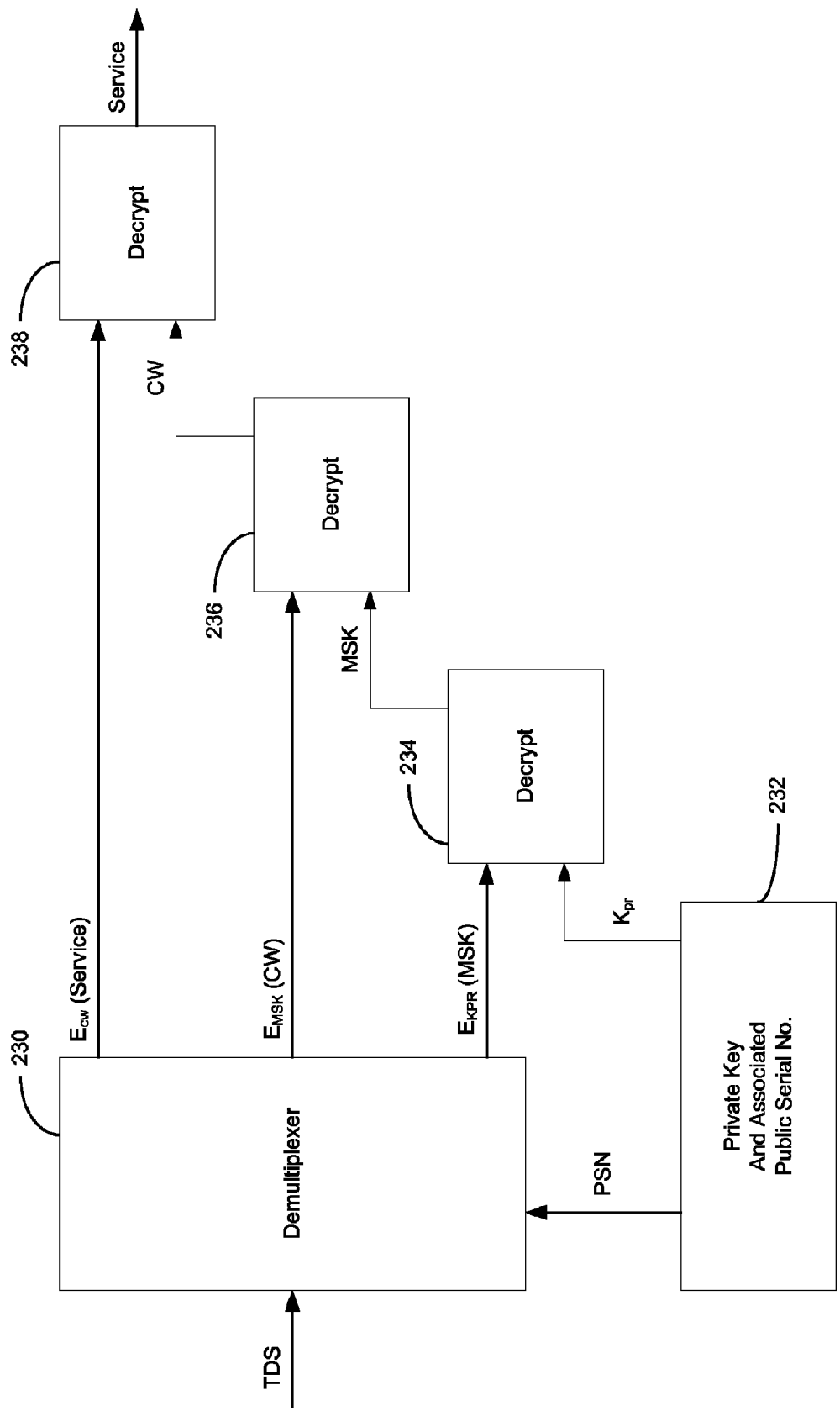
FIG. 2B is a block diagram of a service instance decryption.

In FIG. 2B, the corresponding DHCT private key and associated DHCT public secure micro serial number are stored in memory 232 of decoder 240. Public secure micro serial number is provided so that demultiplexer 230 can select an encrypted multi-session key addressed to decoder 240 from transport data stream (TDS). Encrypted multi-session key $E_{Kpr}$(MSK) is decrypted in decryptor 234 using DHCT private key from memory 232 to provide multi-session key MSK. Demultiplexer 230 also selects from transport data stream TDS encrypted control word (CW) $E_{MSK}$(CW). The encrypted CW is processed in decryptor 236 using multi-session key MSK as the decryption key to provide the unencrypted CW. The unencrypted CW preferably changes at a high rate, for example, once every few seconds. Demultiplexer 230 also selects from transport data stream TDS encrypted service $E_{CW}$(SERVICE). The encrypted service is processed in decryptor 238 using the CW as the decryption key to recover the unencrypted service.

Figure 3:
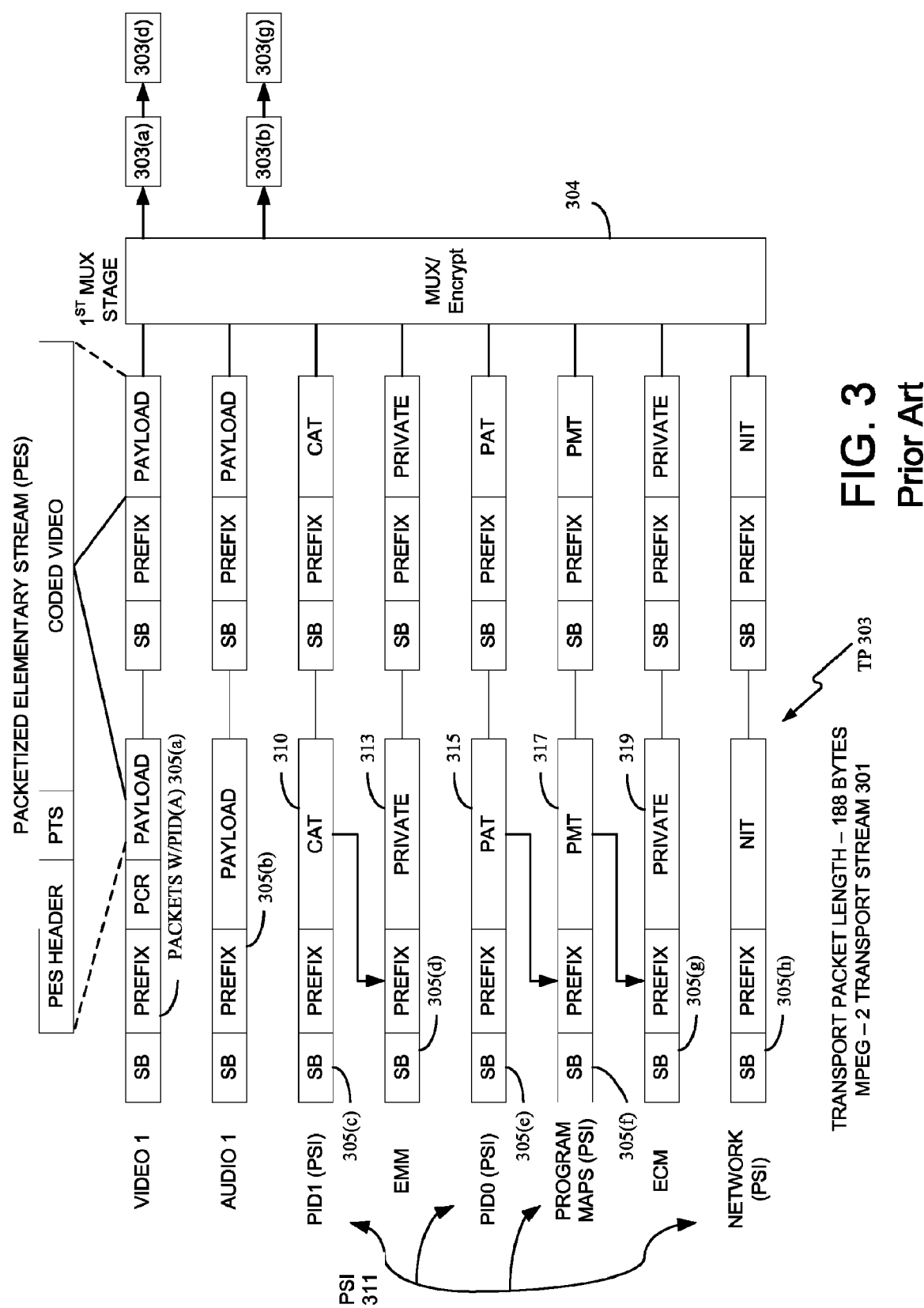
FIG. 3 is a schematic representation of an MPEG-2 transport stream.

FIG. 3 is a schematic representation of an MPEG-2 transport stream 301. An MPEG-2 transport stream is made up of a sequence of 188-byte long transport packets 303. The packets 303 in the stream carry information that, when combined at a DHCT 113, defines an instance of a service and the access rights of a given DHCT 113 to the service. There are two broad categories of information: program 309, which is the information needed to produce the actual pictures and sound; and program specific information (PSI) 311, which is information concerning matters such as how the transport stream is to be sent across the network, how the program 309 is packetized, and what data is used to limit access to the program 309. Each of these broad categories has a number of subcategories. For example, program 309 may include video information and several channels of audio information.

Each transport packet 303 has a packet identifier, or PID, and all of the packets 303 that are carrying information for a given subcategory will have the same PID. Thus, in FIG. 3, the packets carrying Video 1 all have PID (a), and the packets belonging to that subcategory are identified by 305(a). Similarly, the packets carrying Audio 1 all have PID (b), and the packets belonging to that category are identified by 305(b). A subcategory of information can thus be identified by the PID of its packets. As shown at output packets 307, the output from multiplexer 304 is a sequence of contiguous individual packets from the various subcategories. Any part or all of MPEG-2 transport stream 301 may be encrypted, except that PSI packets, packet headers and adaptation fields are never encrypted. In the preferred embodiment, the sets of packets making up program 309 are encrypted according to the DES algorithm, with the control word as a key.

Two of the subcategories are special: those identified by PID 0 (305(e)) and PID 1 (305(c)) list the PIDs of the other packets associated with the service(s) and thus can be used to find all of the information associated with any service. The packets in PID 1 305(c) have as their contents a conditional access table (CAT) 310, which lists the PIDs of other packets that contain EMMs. One set of such packets appears as EMM packets 305(d), as indicated by the arrow from CAT 310 to packets 305(d). Each packet 303 in packets 305(d) contains private information, that is, information which is private to a conditional access system. Private information 313, for the purposes of this invention, is a sequence of CA messages, each of which contains an EMM, and private information 319, is a sequence of messages, each of which contains an ECM.

The packets in PID 0 305(e) contain a program association table (PAT) that lists PIDs of packets that are associated with a particular instance of a service. One such set of packets is program maps packets 305(f), which contain a program map table (PMT) 317 that lists, amongst other things, the PIDs of transport packets 303 containing ECMs for the program. One such set of packets is shown at 305(g). Each of the transport packets contains private information 319, which in this case is a sequence of CA messages, each of which contains an ECM.

In a conditional access (CA) system, the messages have a common format, namely a header, the message itself, and a message authentication code, or MAC. The header contains the following information:
 the type of the message, i.e., whether it is an ECM, EMM, or some other type;
 the length of the message;
 an identifier for the conditional access system;
 an identifier for the type of security algorithm used with the message, including encryption of the message and authentication of its contents; and
 the length of the message content.

The header is followed by the encrypted message and the MAC, which, depending on the message type, may be a sealed digest or a digest made with some or all of the MSK together with the message. For further information regarding a conditional access system and its details, refer to U.S. Pat. No. 6,424,714, Wasilewski, et al., entitled "Conditional Access System," the disclosure and teachings of which are incorporated by reference in its entirety.

The present invention extends this conditional access system encryption and decryption approach to include additional data fields granting access to enhanced programs or services, such as games, a music jukebox, higher memory, high definition resolution, or advertising insertion, for example. The enhanced programs or services can be requested via a DHCT 113 or alternatively can be authorized at the service provider 103 of the communications system. In accordance with the present invention, appropriate safeguards are in place to control and provide security to services by including them as cryptographically protected attributes of the programs themselves.

Figure 4:
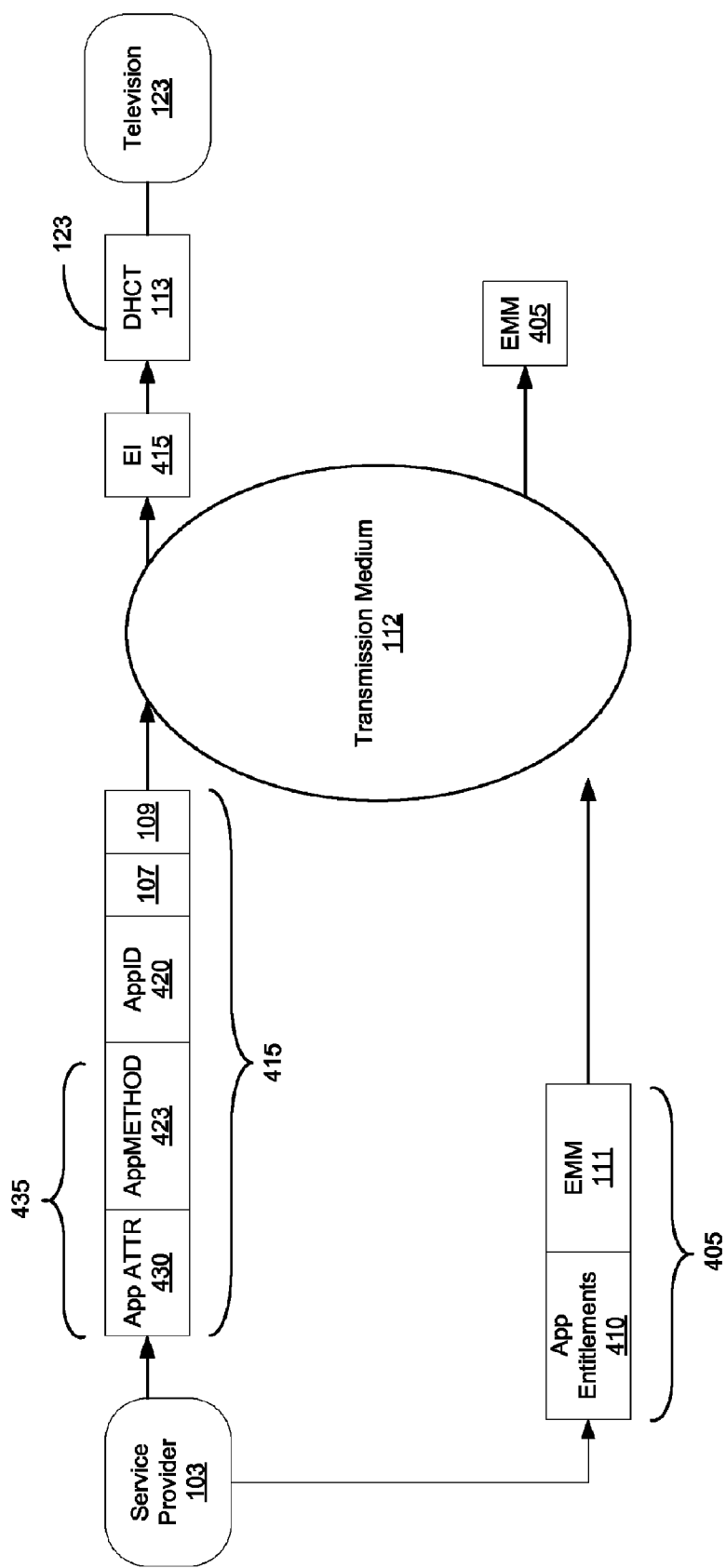
FIG. 4 is a block diagram of a conditional access system providing enhanced features.
Figure 5:
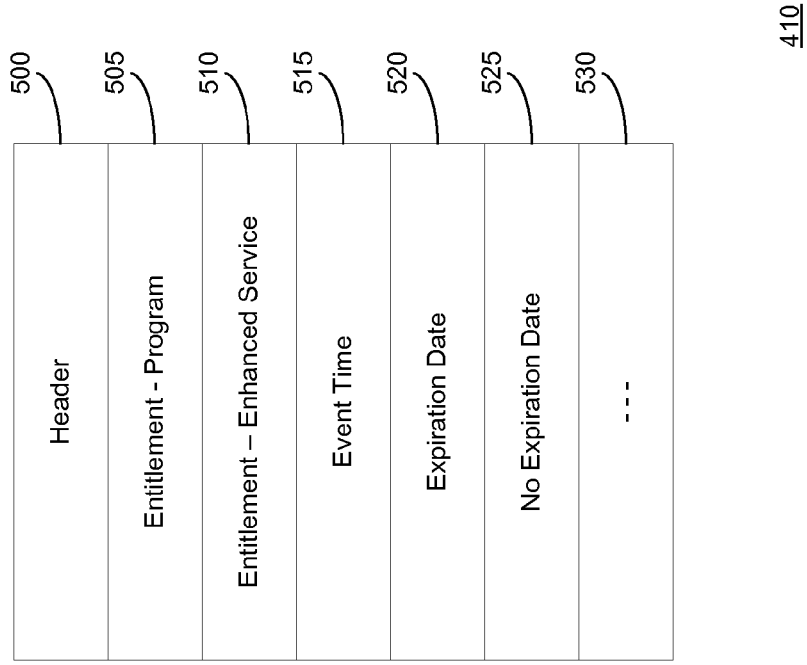
FIG. 5 is a diagram of a portion of an EMM entitling a program and an enhanced service.

FIG. 4 is a block diagram of a conditional access system providing enhanced features. In accordance with the present invention, EMMs 405 granting entitlements may also include enhanced application or service entitlements (AppENTITLEMENTs) 410 that are provided to an authorized DHCT 113 typically via an out-of-band channel. FIG. 5 is a diagram of a portion of an EMM entitling a program and an enhanced service. The application entitlement 410 indicates the header information 500 and the program that is granted to the DHCT 505. Additionally, field 510 grants entitlement to an enhanced service. Other information included in the application entitlement 410 is the event time 515, an expiration date 520, or maybe a flag indicating that there is no expiration date 525, among other data 530. The actual form of the data fields may be text, bit maps, or other representations; however, the content of each data field corresponds to entitlement identifiers (EIDs) that are in turn associated by the system with specific instances (e.g., programs, movies, etc.) that are transmitted over the network.

Each AppENTITLEMENT 410 is directly linked to a corresponding ECM 415, which includes application identifiers (AppIDs) 420, application methods (AppMETHODs) 425, and application attributes (AppATTRIBUTEs) 430. It will be appreciated that the AppENTITLEMENT 410 and the corresponding ECM 415 do not have to be provided to the DHCT 113 concurrently. For example, the AppENTITLEMENT 410 may be provided to the DHCT 113 two weeks or two days prior to the ECM 415 being received. ECMs 415 are typically sent in-band with the services and are used to deliver the keys to decrypt the service.

The AppID 420 is a unique identifier identifying the authorized application. The AppATTRIBUTE 430 and AppMETHOD 425 are essentially application controls (AppCONTROLs) 435. The application attribute 430 comprises parameters and confidential data that characterize the application. By way of example, application attributes 430 may include parameters affecting the display, sound, resolution, and alphablend. The application method 425 includes functions that an application can perform. For example, the application method 425 may enable or disable the return path, overlay graphics, or affect keyboard input. Also, the application method 425 may link to application source code and show, for example, program bloopers or actor interviews.

There are typically three classes of applications: a natively registered application; a securely downloaded application; and a wild or rogue application. A natively registered application (class 1) is trusted because it was loaded at manufacture time in such a way that they cannot be altered or subverted. A real-time operating system (RTOS) that is programmed in memory is an example. Another example is a conditional access program in a tamper-proof hardware module. Securely downloaded applications (class 2) are trusted because both their source of origin and integrity of content have been verified by secure means, for example, by digital signature, under the direction of a class 1 application. Thus, their behavior will follow the direction of the AppCONTROLs 435 because they have been certified to do so before their downloading was permitted. Wild or rogue applications (class 3) are not trusted and can be controlled only by allowing access to a safe profile of system functions. In some cases, the safe profile may be the null set and a class 3 application would not be allowed to execute at all. A class 1 or class 2 application running on the terminal would be required to enforce this profile. A native RTOS could perform this function, for example.

In accordance with the present invention, it is assumed that the enhanced application is well-behaved or in some other way a controlled entity. Thus, by including application controls 435 (i.e., application methods 425 and application attributes 430) within ECMs 415 that carry both EIDs and keys that permit access to the enhanced application or service, the behavior of applications associated with the service or that try to execute while a service is being displayed at the DHCT 113 can also be controlled.

In accordance with the present invention, AppENTITLEMENTs 410 are delivered via secure EMMs 405 to a secure processor in the DHCT 113 or are implanted into class 1 or class 2 application codes when they are created. Corresponding AppCONTROLs 435 are placed within ECMs 415 associated with specific services as desired to limit access to AppMETHODs 425. Before class 1 or class 2 applications execute instructions associated with an AppMETHOD 425, the entitlement 410 for the AppMETHOD 425 is checked. If the entitlement 410 has been granted, the AppMETHOD 425 is executed. If the entitlement 410 has not been granted, it is not executed.

Additionally, in accordance with the present invention, class 1 applications can be programmed to allow selective access to their AppMETHODs 425. For example, an RTOS could be programmed to disallow access to a channel tuning or graphics overlay function. Thus, some AppMETHODs 425 could be accessible to all classes of applications while others could be restricted to certain classes. For instance, a class 1 RTOS may allow all class 3 applications to have access to a keyboard input function, but would not allow any display functions to be executed by the class 3 applications. The same RTOS could be programmed to allow certain class 2 applications that present appropriate credentials to have access to a specified subset of its AppMETHODs 425.

Furthermore, in accordance with the present invention, the AppCONTROLs 435 may be varied dynamically during the transmission of the service. The AppCONTROL field 435 within the ECMs 415 can be changed either by manual or automated (e.g., prescheduled) intervention. The AppCONTROLs 435 may also be activated by the subscriber locally at the terminal. Thus, an application running in conjunction with a service may, for example, by default display its graphics only in low resolution mode. By request of the subscriber, an entitlement to a higher resolution mode, where the entitlement is provided as the AppENTITLEMENT 410, may be purchased and stored in secure non-volatile memory in the DHCT 113 for either immediate or delayed uploading to the service provider 103. In either case, the AppCONTROl, 435 is activated as soon as the application and specified AppCONTROL 435 become available to the DHCT 113. The AppCONTROL activation may also be purchased by the subscriber in an advanced reservation mode. In this case, the entitlement for the AppCONTROL 435 is loaded by an EMM 405 addressed to the DHCT 113 of the subscriber in advance of the time of activation of the application, availability of the AppCONTROL 435, or both.

The Detailed Description of a Preferred Embodiment set forth above is to be regarded as exemplary and not restrictive, and the breadth of the invention disclosed herein is to be determined from the claims as interpreted with the full breadth permitted by the patent laws.

What is claimed is:

1. A conditional access system for transmitting encrypted data, the conditional access system comprising:
   an entitlement management message (EMM), provided to a set-top box, including a first entitlement and a second entitlement, the first entitlement corresponding to an encrypted program and the second entitlement corresponding to an enhanced service; and
   an entitlement control message (ECM), provided to the set-top box, including a key to decrypt the encrypted program providing a decrypted program, and an application identifier and an application control that are required to identify and control the enhanced service wherein the application identifier identifies the enhanced service, and wherein the application control comprises an application method for providing functions that the enhanced service performs, the provided functions comprising enabling and disabling each of the following: a return path, overlay graphics, and affect keyboard input, wherein access to the functions is restricted based on a determined application class, wherein the application class comprises at least one of the following: a natively registered application, a securely downloaded application, and a rogue application, wherein the access to the functions being restricted based on the determined application class comprises the rogue application only being allowed access to a safe profile of system functions, and wherein the application method further providing a link to the associated application's source code.

2. The conditional access system of claim 1, wherein the enhanced service is a cryptographically protected attribute of the encrypted program.

3. The conditional access system of claim 1, wherein the EMM and the ECM are provided to a set-top box (DHCT) concurrently.

4. The conditional access system of claim 1, wherein the EMM including the second entitlement is provided to a set-top box prior to the ECM being received by the set-top box.

5. The conditional access system of claim 1, wherein the application control comprises: an application attribute for providing parameters and data that characterize the enhanced service.

6. The conditional access system of claim 5, wherein the application attribute may include parameters affecting a display, sound, resolution, and alphablend.

7. The conditional access system of claim 1, wherein the application identifier identifies an application resident on the set-top box.

8. The conditional access system of claim 1, wherein the application identifier identifies an application that is downloadable to the set-top box.

9. The conditional access system of claim 1, wherein the second entitlement includes one or more fields specifying an event time, an expiration date or time, or no expiration associated with the enhanced service.

10. A set-top box for receiving encrypted content and for decryption of the encrypted content, the set-top box comprising:

a memory;

a control word extractor for producing a control word in accordance with authorization information, wherein the authorization information includes received application entitlements including a first entitlement and a second entitlement, the first entitlement corresponding to at least one encrypted program and the second entitlement corresponding to an enhanced service; and a decryptor for decrypting authorized encrypted programs and enhanced services in accordance with the control word when a corresponding entitlement control message is received, the entitlement control message including an application identifier and an application control wherein the application control comprises an application method for providing functions that the enhanced service can perform, the provided functions comprising enabling and disabling each of the following: a return path, overlay graphics, and affect keyboard input, wherein access to the functions is restricted based on a determined application class, wherein the application class comprises at least one of the following: a natively registered application, a securely downloaded application, and a rogue application, wherein the access to the functions being restricted based on the determined application class comprises the rogue application only being allowed access to a safe profile of system functions, and wherein the application method further provides a link to the associated application's source code.

11. The set-top box of claim 10, wherein the enhanced service is a cryptographically-protected attribute of the encrypted program.

12. The set-top box of claim 10, wherein the entitlement management message and the entitlement control message are received concurrently.

13. The set-top box of claim 10, wherein the entitlement management message is received prior to receiving the entitlement control message.

14. The set-top box of claim 10, wherein the application identifier identifies the enhanced service, and wherein the application control comprises: an application attribute for providing parameters and data that characterize the enhanced service.

15. The set-top box of claim 14, wherein the application attribute may include parameters affecting a display, sound, resolution, and alphablend.

16. The set-top box of claim 10, wherein the application identifier identifies an application that is downloadable to the set-top box or is resident on the set-top box.

17. The set-top box of claim 10, wherein the second entitlement includes one or more fields specifying an event time, an expiration date or time, or no expiration that are associated with the enhanced service.

18. A conditional access system for transmitting encrypted data, the conditional access system comprising:

an entitlement management message (EMM), received at a set-top box, including a first entitlement and a second entitlement, the first entitlement corresponding to an encrypted program and the second entitlement corresponding to an enhanced service; and an entitlement control message (ECM), received at a set-top box, including a key to decrypt the encrypted program providing a decrypted program, and an application identifier and an application control that are required to identify and control the enhanced service wherein the application identifier identifies the enhanced service, and wherein the application control comprises an application method for providing functions that the enhanced service can perform, wherein access to the functions is restricted based on a determined application class, wherein the application class comprises at least one of the following: a natively registered application, a securely downloaded application, and a rogue application, wherein the access to the functions being restricted based on the determined application class comprises the rogue application only being allowed access to a safe profile of system functions, the safe profile of system functions comprising a null set, and wherein the application method further provides a link to the associated application's source code.

19. The conditional access system of claim 18, wherein the application control comprises an application attribute for providing parameters and data that characterize the enhanced service.

20. The conditional access system of claim 18, wherein the application method may enable or disable a return path.

21. The conditional access system of claim 18, wherein the application method may allow or disallow overlay graphics on the decrypted program.

* * * * *